United States Patent [19]
Perez

[11] 3,909,979
[45] Oct. 7, 1975

[54] FLOWER STEM WRAPPER
[76] Inventor: Charles G. Perez, 3448 E. Edgemont, Tucson, Ariz. 85716
[22] Filed: Oct. 3, 1974
[21] Appl. No.: 511,841

[52] U.S. Cl. ................ 47/55; 24/30.5 T; 24/5; 161/26
[51] Int. Cl.² ... A01G 5/00; A47G 7/00; A41G 1/00
[58] Field of Search ........ 24/5, 16, 17, 30.5, 73 PB; 47/55, 41.12; 40/21; 161/26–28, 30

[56] References Cited
UNITED STATES PATENTS

| | | | |
|---|---|---|---|
| 3,147,523 | 9/1964 | Logan | 24/16 PB |
| 3,409,948 | 11/1968 | Goodwin | 24/16 |
| 3,747,163 | 7/1973 | Serino | 24/16 PB |
| 3,747,269 | 7/1973 | Adams | 47/55 |
| 3,777,400 | 12/1973 | Klenz et al. | 24/30.5 T |
| 3,793,126 | 2/1974 | McAdams | 161/28 |

FOREIGN PATENTS OR APPLICATIONS

| | | |
|---|---|---|
| 974,419 | 2/1951 | France |
| 56,919 | 8/1912 | Germany |

*Primary Examiner*—Robert E. Bagwill
*Attorney, Agent, or Firm*—Robert K. Rhea

[57] ABSTRACT

An elongated flexible strip is longitudinally provided with an embedded wire formed of soft metallic material. A transverse aperture in the strand surrounds an intermediate portion of one or more flower stems and the elongated strip is wrapped around the flower stems and/or a flower support in flower supporting relation.

2 Claims, 9 Drawing Figures

U.S. Patent  Oct. 7,1975  3,909,979
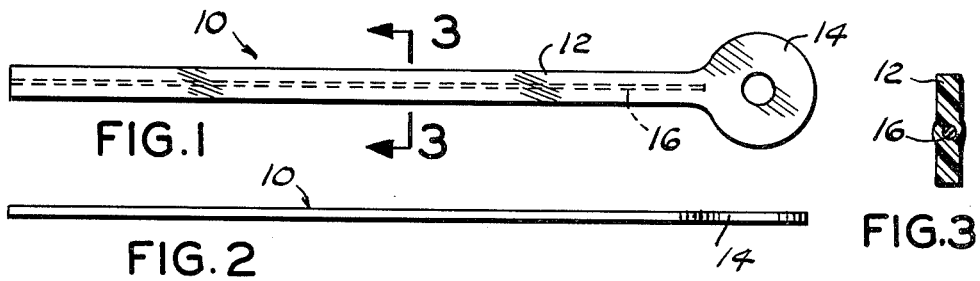
FIG.1
FIG.2
FIG.3
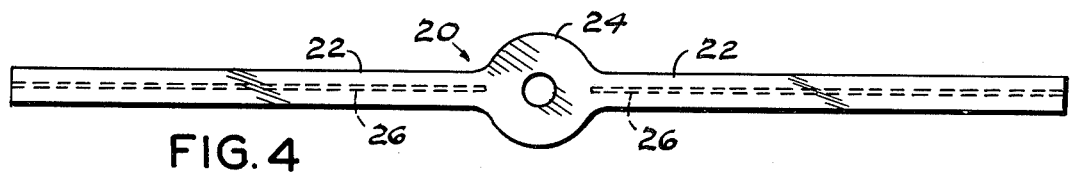
FIG.4
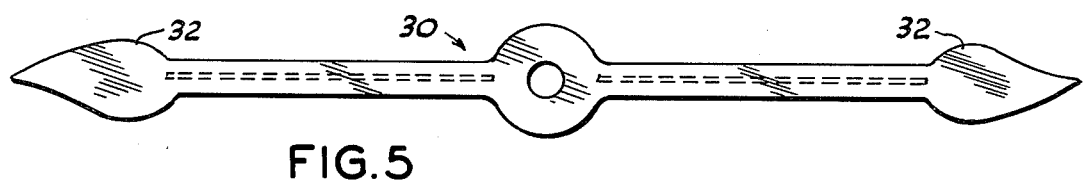
FIG.5
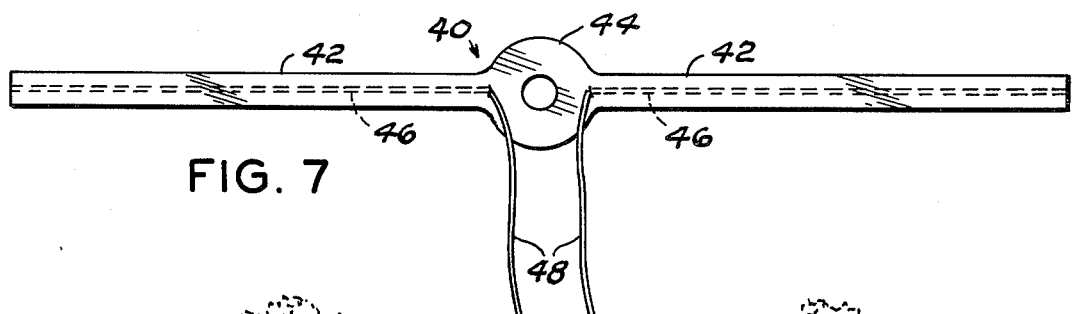
FIG.7
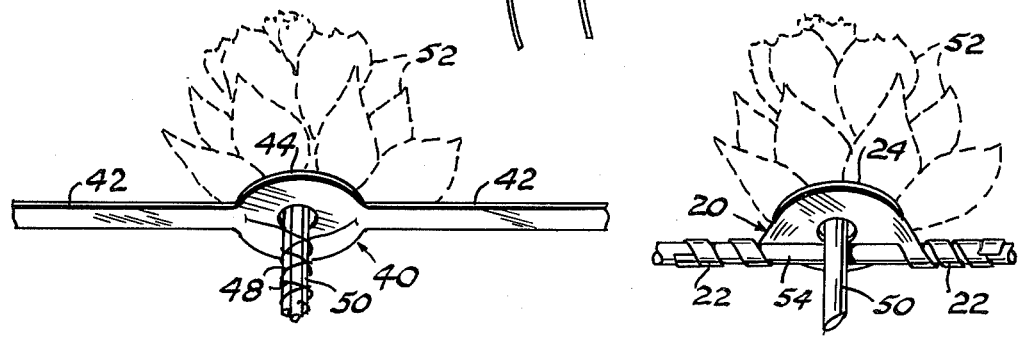
FIG.8  FIG.6
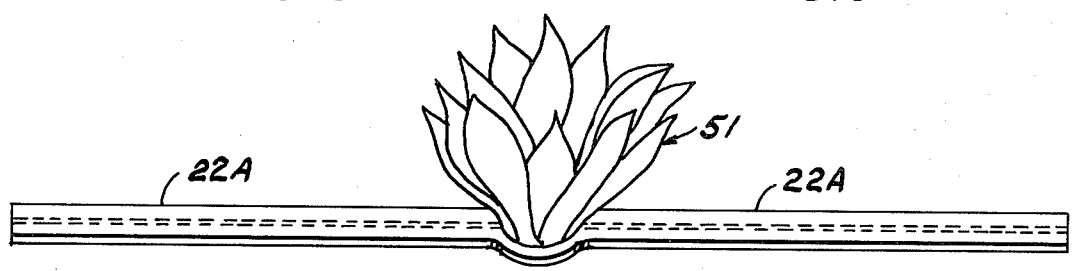
FIG.9

FLOWER STEM WRAPPER

BACKGROUND OF THE INVENTION

1. Field of the Invention

The present invention relates to supports for floral decorations and more particularly to a flower stem support.

It is sometimes desirable to fasten natural or artificial flowers to other foliage or articles to create a floral arrangement or decorative appearance.

This invention provides a means for supporting flowers on an existing support.

2. Description of the Prior Art

Flexible and bendable strips for supporting foliage has been known but such flexible strips are not usually provided with an aperture for surrounding the stem of natural or artificial flowers to maintain them in a desired position.

SUMMARY OF THE INVENTION

An elongated flexible strip, relatively narrow when compared with its width, is provided with a longitudinally embedded strand formed of soft metallic material and a transverse aperture is formed through a transversely enlarged portion of the strip at one end thereof, in one embodiment, for surrounding an intermediate portion of floral stems. The elongated strip is then wrapped around the flower stems and/or a supporting structure.

In another embodiment the centrally apertured transversely enlarged portion is formed intermediate the ends of the strip and may include leaf-like members at their respective ends.

In a further embodiment the wires project laterally of the transversely apertured and enlarged portion.

The principal object of this invention is to provide an elongated flexible strip having a transverse aperture for surrounding flower stems with the strip then being wrapped around the flower stems or a support.

BRIEF DESCRIPTION OF THE DRAWINGS

FIG. 1 is a top plan view of one embodiment of the device;

FIG. 2 is a side elevational view of FIG. 1;

FIG. 3 is a vertical cross sectional view, to an enlarged scale, taken substantially along the line 3—3 of FIG. 1;

FIG. 4 is a top plan view of another embodiment of the device;

FIG. 5 is a view similar to FIG. 4 illustrating a further modification of the device;

FIG. 6 is a perspective view illustrating the device of FIG. 4 supporting a flower, shown by dotted lines, on a support;

FIG. 7 is a view similar to FIG. 4 illustrating another embodiment of the device;

FIG. 8 is a view similar to FIG. 6 illustrating the device of FIG. 7 supporting a flower prior to wrapping the respective ends of the device around the stem and/or a support; and, FIG. 9 is a perspective view of a flower integrally formed with the device.

DESCRIPTION OF THE PREFERRED EMBODIMENTS

Like characters of reference designate like parts in those figures of the drawings in which they occur.

In the drawings:

The reference numeral 10 indicates the device comprising an elongated strip 12, preferably formed of flexible and pliable plastic material, relatively thin when compared with its width and having a part-circular centrally apertured enlarged portion 14 at one end. The strip 12 is provided with a longitudinally extending centrally embedded strand 16 preferably formed of soft metallic material, such as copper or aluminum wire easily bent beyond its elastic limit.

The reference numeral 20 indicates another embodiment comprising an elongated strip 22 having a central part-circular centrally apertured enlarged portion 24 with the respective strand end portions 22 provided with a centrally embedded wire strand 26.

The reference numeral 30 indicates a modification of the device 20 which is substantially identical therewith with the exception that the respective ends thereof are transversely enlarged and contoured to represent an imitation leaf 32.

The reference numeral 40 indicates an additional embodiment having elongated strips or end portions 42 integrally connected with a centrally apertured part-circular portion 44 with one end portion of the respective embedded wire-like strand 46 projecting laterally of the apertured central portion 44, as at 48.

An artificial flower 51, or the like (FIG. 9), may be formed integral with the strip 22A.

OPERATION

Referring to FIG. 6, the device 20 has the stem portion 50 of one or more flowers 52 inserted through the aperture of the centrally enlarged portion 24 with the respective strip end portion 22 being wrapped around a common support 54 for supporting the flowers 52 in the desired location or position.

Referring also to FIG. 8, the device 40 is shown in similar supporting relation with respect to the stem or stems 50 of the flowers 52 with the wire end portions 48 being wrapped around the stem or stems 50 wherein the strip end portions 42 may then be wrapped around the flower stems and or a support.

The embodiment of FIG. 9 is attached where desired by wrapping the respective ends of the strip 22A about a suitable support, not shown.

Obviously the invention is susceptible to changes or alterations without defeating its practicability, therefore, I do not wish to be confined to the preferred embodiment shown in the drawings and described herein.

I claim:

1. A flower stem support, comprising:
    an elongated strip of pliable plastic material having a thickness substantially less than its transverse width and having a centrally apertured transversely enlarged portion; and,
    an elongated length of yieldable metallic material embedded within said strip, said enlarged portion is disposed intermediate the ends of said strip, and said wire is divided to form a pair of wires each having an end portion projecting laterally from the surface of said strip from opposing limits of said enlarged portion.
2. The flower stem support according to claim 1 in which said metallic material comprises a wire.

* * * * *